US009126736B1

(12) United States Patent
Wright

(10) Patent No.: US 9,126,736 B1
(45) Date of Patent: Sep. 8, 2015

(54) COMPACT TABLE TRASH CONTAINER WITH INTEGRATED CONDIMENT RECEPTACLES AND ASSOCIATED METHOD

(71) Applicant: Fernando Wright, Louisville, KY (US)

(72) Inventor: Fernando Wright, Louisville, KY (US)

( * ) Notice: Subject to any disclaimer, the term of this patent is extended or adjusted under 35 U.S.C. 154(b) by 0 days.

(21) Appl. No.: 13/780,781

(22) Filed: Feb. 28, 2013

Related U.S. Application Data

(63) Continuation-in-part of application No. 12/380,241, filed on Feb. 25, 2009, now abandoned.

(51) Int. Cl.
| | |
|---|---|
| *B65D 71/70* | (2006.01) |
| *B65D 71/50* | (2006.01) |
| *B65D 1/36* | (2006.01) |
| *B65D 21/02* | (2006.01) |
| *B65F 1/14* | (2006.01) |
| *B65D 21/08* | (2006.01) |
| *B23P 11/00* | (2006.01) |

(52) U.S. Cl.
CPC .................. *B65D 71/70* (2013.01); *B23P 11/00* (2013.01); *B65D 1/36* (2013.01); *B65D 21/08* (2013.01); *B65D 71/50* (2013.01); *B65F 1/14* (2013.01)

(58) Field of Classification Search
CPC ........... B65D 21/0237; B65D 21/0233; B65D 21/023; B65D 71/70; B65D 1/36; B65D 81/3825; A47G 23/0641; A47G 19/04
USPC .............. 220/505, 23.88, 507, 528, 555, 556, 220/23.86, 23.87, 820, 810, 823, 824, 220/259.1, 254.4, 845, 254.1, 254.3, 825, 220/821, 836; D7/600.1, 700; 206/564, 206/575, 576
See application file for complete search history.

(56) References Cited

U.S. PATENT DOCUMENTS

| | | | | | |
|---|---|---|---|---|---|
| 3,632,038 | A | * | 1/1972 | Souza | 229/125.19 |
| D242,203 | S | * | 11/1976 | Falbo | D7/599 |
| 4,122,780 | A | * | 10/1978 | Brickman | 108/25 |
| D252,492 | S | * | 7/1979 | Synder | D7/599 |
| D302,904 | S | * | 8/1989 | Dunkfeld, Jr. | D7/709 |
| 5,890,589 | A | * | 4/1999 | Lorens | 206/232 |
| 6,269,964 | B1 | * | 8/2001 | Turner, Jr. | 220/23.86 |
| 6,321,662 | B1 | * | 11/2001 | Fraise | 108/25 |
| 6,591,990 | B2 | * | 7/2003 | Lanman et al. | 211/10 |
| 6,752,288 | B1 | * | 6/2004 | Swift | 220/551 |
| 7,044,321 | B2 | * | 5/2006 | Smith et al. | 220/23.87 |
| 7,232,039 | B2 | * | 6/2007 | Doran | 220/23.88 |
| 7,428,864 | B2 | * | 9/2008 | Wengrovsky | 99/646 C |
| 2010/0044265 | A1 | * | 2/2010 | Ragsdale et al. | 206/518 |

* cited by examiner

*Primary Examiner* — Jeffrey Allen
*Assistant Examiner* — Jennifer Castriotta

(57) ABSTRACT

A combined trash receptacle and condiment holding apparatus includes a base member having a plurality of side walls configured in such a manner that an orifice as well as a plurality of recessed receptacles are formed in the base member, a plurality of vessels removably positioned within the receptacles, respectively, and supported at the base member, and a container removably positioned within the orifice and intermediately juxtaposed between the vessels respectively. The container is adapted to receive and segregate the trash therein while the vessels are adapted to receive the foodstuff therein. The orifice and the receptacles extend downwardly from an uppermost surface of the base member and remain supported on a lowermost surface of the base member. In this manner, the container and the vessels remain at a static and fixed upright position when the base member is transported.

11 Claims, 9 Drawing Sheets

COMPACT TABLE TRASH CONTAINER WITH INTEGRATED CONDIMENT RECEPTACLES AND ASSOCIATED METHOD

CROSS REFERENCE TO RELATED APPLICATIONS

This application is a continuation-in-part application of U.S. patent application Ser. No. 12/380,241 filed Feb. 25, 2009 and currently pending, which claims the benefit of U.S. Provisional Application No. 61/067,106 filed Feb. 26, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to compact containers and, more particularly, to a combined trash receptacle and condiment holding apparatus for segregating trash from foodstuff on an existing eating surface.

2. Prior Art

An attractive public restaurant is characterized by an appearance of neatness and cleanliness. This is difficult to maintain when dining tables quickly become cluttered with various paper and plastic items provided largely in conformance with sanitary regulations. Such items consist of paper envelopes for sugar, waxed paper covers for wafers, paper covers for drinking straws, waxed paper covers for butter pats, plastic jelly containers, tooth picks used with hors d'oeuvres—not to mention trash associated with smoking, such as plastic cigar covers and paper cigar bands, empty match covers and tops of cigarette packages.

A table may also become cluttered by many items, such as condiments and sugar packets, which are used to add additional flavors to a user's foods. More items could be kept on the table if there was enough storage space, thereby adding to the convenience of the consumer. Most consumers can attest to the frustration of asking their server to bring them a straw or a wet nap, only to wait an extended amount of time because the server is busy. Obviously, it would be advantageous to provide a means for storing such items on a table, thereby providing easy access to the customers and further relieving the burden from a hardworking server.

The present invention satisfies such a need by providing specially integrated condiment receptacles alongside the convenient and compact trash receptacle. The integrated condiment receptacles can be used for storing a variety of convenient and useful items such as condiments, sugar packets, crayons, straws, crackers, or any other variety of useful items.

This invention also provides a convenient trash receptacle in which diners can dispose of these pieces of paper and plastic as they appear so as to keep them out of sight, at the same time avoiding the possibility of creating a small blaze resulting from trash being carelessly dropped in an ashtray containing an unextinguished cigarette.

Since dining tables either at home, or in public restaurants are often crowded for space, a trash receptacle maximizes available space and allows for a diner to conveniently dispose of unwanted wrappers, articles, or other pieces of trash without leaving the table. Prior means of performing table trash disposal has been used in a self-service "fast food" restaurant by providing a large slot in the top of the table, giving access to a container beneath the table. It is obvious that this solution is hardly suitable for an attractive restaurant with cloth-covered tables for which the subject invention is particularly designed in a number of novel embodiments.

Accordingly, the compact table trash container with integrated condiment receptacles was designed in order to overcome the above noted problems. The present invention satisfies such a need by providing a compact table trash container with integrated condiment receptacles that is convenient and easy to use, inexpensive, durable, sanitary, and efficient.

BRIEF SUMMARY OF THE INVENTION

In view of the foregoing background, it is therefore an object of the present invention to provide an apparatus for (for clause from first claim preamble). These and other objects, features, and advantages of the invention are provided by an (name of invention). The apparatus of this invention is referred to generally in the figures and is intended to provide a combined trash receptacle and condiment holding apparatus. It should be understood that the apparatus may be used to contain many different types of articles and should not be used only for trash and food condiments.

A combined trash receptacle and condiment holding apparatus for segregating trash from foodstuff on an existing eating surface may include a base member. Such a base member may have a plurality of side walls configured in such a manner that an orifice and a plurality of recessed receptacles are formed in the base member. The base member may be suitably sized to fit in limited space areas such as restaurant table tops and bar counters. Additionally, the base member may be produced from wood, glass, metal, or other material known in the art to create various designs for numerous applications and to be aesthetically pleasing for use in both homes and businesses.

The apparatus may further include a container removably positioned within the orifice of the base member and thereby intermediately juxtaposed between the receptacles respectively. The container may additionally be adapted to receive and segregate trash therein while the receptacles may be adapted to receive foodstuff therein. In this manner, the present invention provides the unpredictable and unexpected benefit of allowing a user to easily store condiments such as ketchup, mustard, and salt and pepper with a trash holding container to house used napkins and other food waste all in one central location. The apparatus may advantageously be an all-in-one space saver to users in public and private arenas alike. The apparatus may be designed with few or many storage receptacles, as may suit the particular needs of a given user.

In addition, the orifice may extend downwardly from an uppermost surface of the base member and pass through a lowermost surface of the base member. In this manner, one of the container and the base member may be freely and independently separated from another one of the container and the base member while the other one of the container and the base member remains at a static and fixed upright position. Thus, when the container is filled with trash, the user may simply remove it from the base member for disposal of its contents and cleaning of both the base member and container. Such a benefit is advantageous for ensuring cleanliness and health requirements are met when used in food serving establishments.

The combined trash receptacle and condiment holding apparatus may additionally include a bottom-most surface of the container being coplanar with a bottom-most surface of the base member when the container and the base member are disposed at the static and fixed upright positions respectively. The container may further have an outermost surface that contiguously adjoins an innermost surface of the orifice so that the container may be linearly displaced along a first vertical axis centrally defined within the orifice while the base member remains at the static and fixed upright position. In addition, the container may remain at the static and fixed upright position while the base member is linearly reciprocated along a linear travel path aligned parallel to a longitudinal length of the container. This advantageously assures the container may remain steadily fixed within the orifice of the base member to prevent accidental tipping and emptying out of the trash housed within the container.

The apparatus may further include each of the receptacles being isolated from the orifice such that the container may remain at the static and fixed upright position while the base member is rotated about the outer surface of container. In this manner, if a user wished to access condiments stored on one side of the base member, the base member may simply be rotated without affecting the container's position. Additionally, the base member may include removably engaged bottom and top lids contiguously situated along an entire surface area of the base member. The receptacles may be formed within the top lid such that a bottom-most surface of the receptacles may lay parallel to a bottom-most surface of the bottom lid. Further, the bottom lid may remain at the static and fixed position while the top lid is detached therefrom. This may advantageously allow the user to remove the top lid to be washed by hand or within a dish washer to further promote cleanliness and health.

The combined trash receptacle and condiment holding apparatus may further include first and second ones of the receptacles being oppositely seated at opposed first and second locations diametrically spaced apart from the orifice. Additionally, the base member may be freely rotatable along a 180 degree arcuate path defined about the container. This may operate such that the first and second receptacles may be synchronously displaced to the second and first locations respectively while the container remains at a static and fixed position. The rotatable base member allows the user to easily access items housed within the receptacles on both sides of the apparatus by simply turning the base member.

The container may further include a reservoir and an access door pivotally conjoined to a top edge of the reservoir. In this manner, an interior of the reservoir may remain isolated from the receptacles during operating conditions. The user may easily open the access door, deposit trash and food waste into the reservoir, and close the door to seal trash therein, promote cleanliness, and reduce odors generated by the waste material.

The present invention may further include a method for segregating trash from foodstuff on an existing eating surface. Such a method may include the chronological steps of first providing a base member preferably having a plurality of side walls configured in such a manner that an orifice as well as a plurality of recessed receptacles may be formed in the base member. A second step of the method may include providing and removably positioning a container within the orifice by intermediately juxtaposing the container between the receptacles respectively. Next, the method may include the container receiving and segregating the trash therein while the receptacles receive the foodstuff therein.

Thereafter, a fourth step of the method may include the orifice extending downwardly from an uppermost surface of the base member and passing through a lowermost surface of the base member. Finally, the method may include a fifth step of freely and independently separating one of the container and the base member from another one of the container and the base member while maintaining the other one of the container and the base member at a static and fixed upright position. A bottom-most surface of the container may be coplanar with a bottom-most surface of the base member when the container and the base member are disposed at the static and fixed upright positions respectively.

The method combined with the present invention provides the unexpected and unpredictable benefit of providing the user with a means of housing common food condiments with a trash receptacle to place waste generated during meals. The apparatus may be employed in the home or by restaurant owners, and placed on each table in an eating establishment. In this manner, the apparatus may advantageously be taken apart for cleaning on a regular basis, and may provide customers of the restaurant with all supplemental items needed during meals, in one central location.

The present disclosure further includes an alternate embodiment including a combined trash receptacle and condiment holding apparatus for segregating trash from foodstuff on an existing eating surface. Such a combined trash receptacle and condiment holding apparatus includes a base member having a plurality of side walls configured in such a manner that an orifice as well as a plurality of recessed receptacles are formed in the base member, a plurality of vessels removably positioned within the receptacles, respectively, and supported at the base member, and a container removably positioned within the orifice and intermediately juxtaposed between the vessels respectively. The container is adapted to receive and segregate the trash therein while the vessels are adapted to receive the foodstuff therein. The orifice and the receptacles extend downwardly from an uppermost surface of the base member and remain supported on a lowermost surface of the base member. In this manner, the container and the vessels remain at a static and fixed upright position when the base member is transported.

In a non-limiting exemplary embodiment, the container is intermediately juxtaposed between the receptacles such that the receptacles are oppositely seated apart from the container.

In a non-limiting exemplary embodiment, the container and the vessels are independently removed from the base member.

In a non-limiting exemplary embodiment, the vessels include a lower section including first, second, third fourth and fifth sides configured to define a cavity therebetween, and an upper section including sixth, seventh and eighth sides monolithically formed with the second, third and fourth sides, respectively. In this manner, the upper section is configured to define an open top end and an open front end extending upwardly from the lower section and in fluid communication with the cavity. A divider is monolithically formed with each of the lower and upper sections thereby bifurcating the cavity into an anterior segment and a posterior segment isolated therefrom.

In a non-limiting exemplary embodiment, the container includes a reservoir, and a lid removably engaged to the reservoir. Such a lid includes a top aperture, and a rectilinear rod having axially opposed first and second ends statically mated to a top of the lid. Thus, the rod spans subjacent to the top aperture. An access door is rotatably coupled to the rod in such a manner that an interior of the reservoir is selectively isolated from the vessels as needed.

In a non-limiting exemplary embodiment, the rod is monolithically formed with the lid and includes a first pair of stops statically wrapped about the first end, and a second pair of stops statically wrapped about the second end. Notably, the access door includes first and second arms removably coupled to first and second ends.

In a non-limiting exemplary embodiment, the first and second arms are intercalated between the first and second pairs of stops, respectively, such that the first and second arms are prohibited from linearly reciprocating along a longitudinal length of the rod while the access door is articulated about the rod.

The present disclosure further includes a method of utilizing a combined trash receptacle and condiment holding apparatus for segregating trash from foodstuff on an existing eating surface. Such a method includes the chronological steps of: providing a base member having a plurality of side walls configured in such a manner that an orifice as well as a plurality of recessed receptacles are formed in the base member (the orifice and the receptacles extend downwardly from an uppermost surface of the base member and remain supported on a lowermost surface of the base member); providing and removably positioning a plurality of vessels within the receptacles, respectively, such that the vessels are supported at the base member; providing and removably positioning a container within the orifice by intermediately juxtaposing the container between the receptacles respectively; the container receiving and segregating the trash therein while the vessels receive the foodstuff therein; and while transporting the base member, maintaining each of the container and the vessels at a static and fixed upright position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
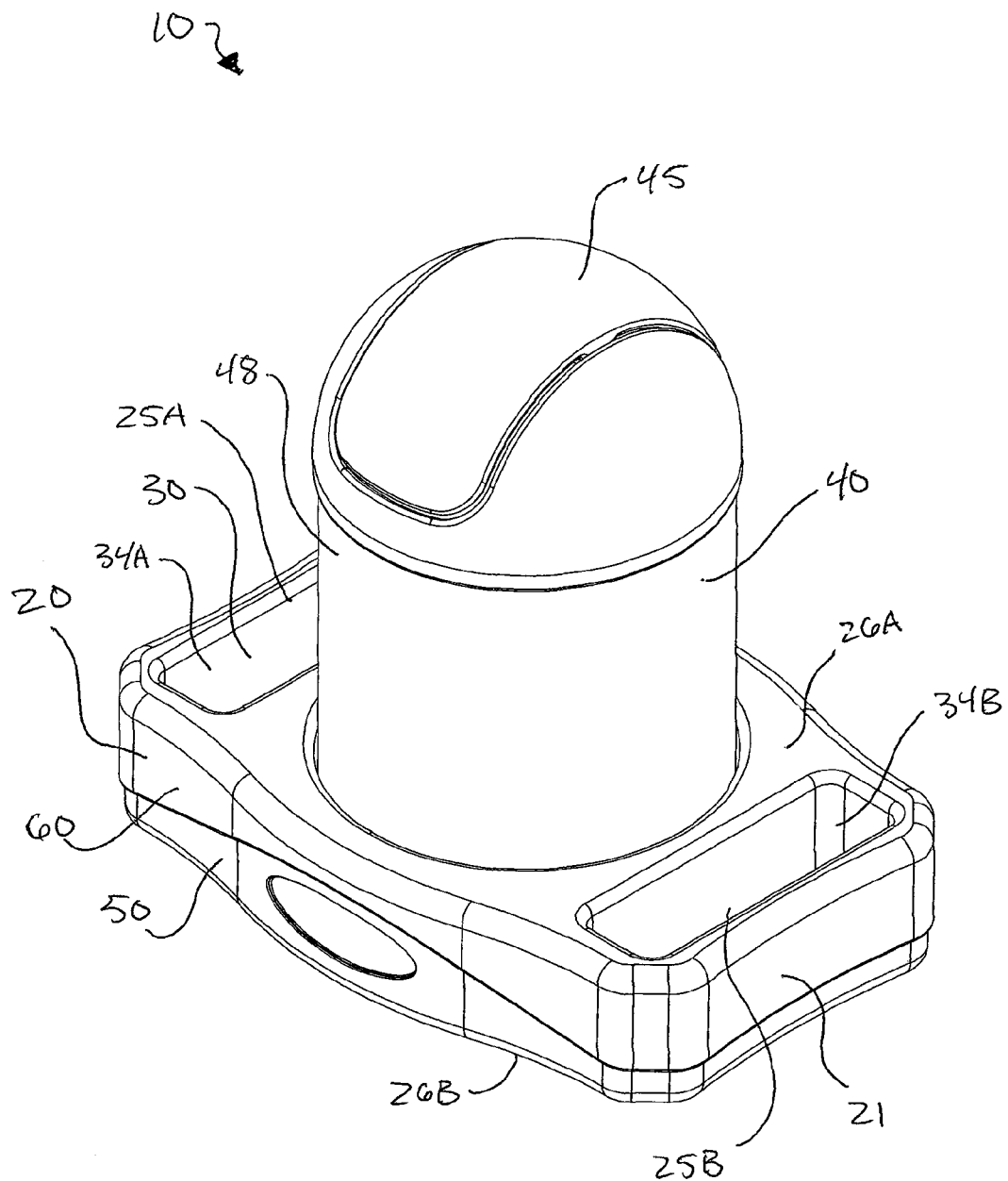
FIG. 1 is a perspective view showing a combined trash receptacle and condiment holding apparatus, in accordance with one embodiment of the present invention.
Figure 2:
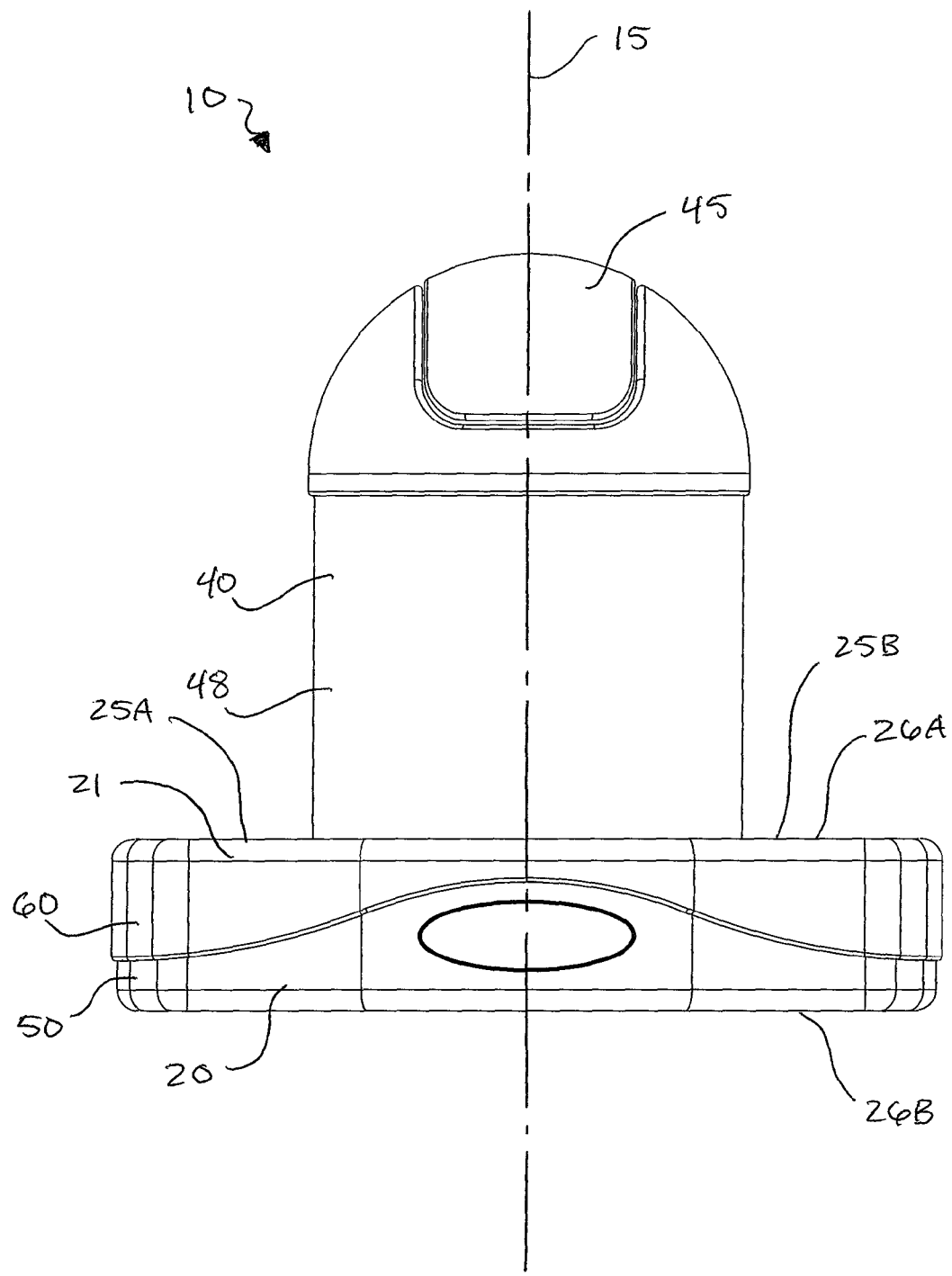
FIG. 2 is a front elevational view of the apparatus shown in FIG. 1.
Figure 3:
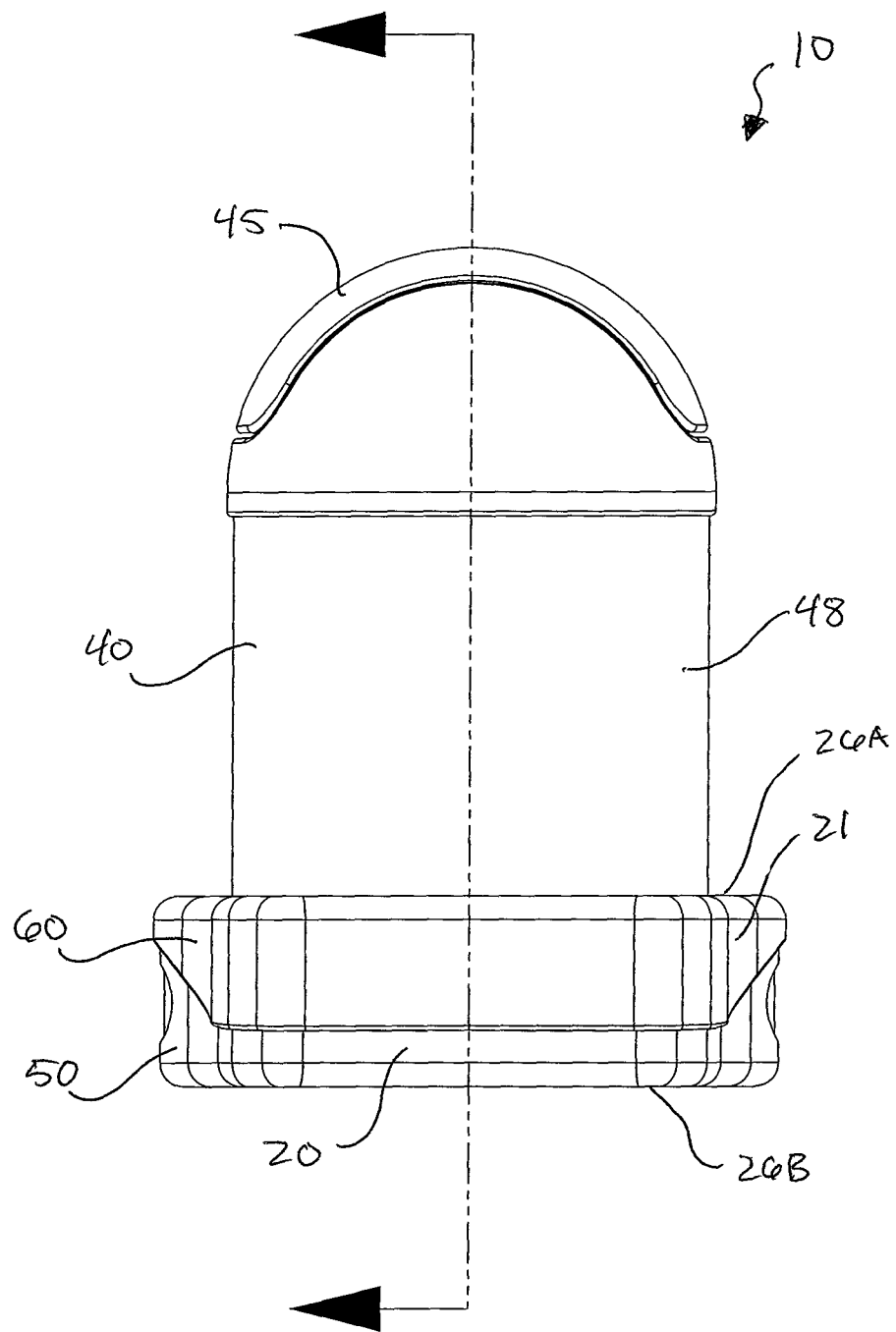
FIG. 3 is a side elevational view of the apparatus shown in FIG. 1.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The apparatus of this invention is referred to generally in FIGS. 1-9 by the reference numeral 10, 100 and is intended to provide a combined trash receptacle and condiment holding apparatus. It should be understood that the combined trash receptacle and condiment holding apparatus 10, 100 may be used to house and store many different items including common restaurant condiments, or a variety of other items as desired by the user for the intended application. The present invention 10, 100 should not be limited by the applications and uses described herein.

Referring initially to FIGS. 1-4, a combined trash receptacle and condiment holding apparatus 10 for segregating trash from foodstuff on an existing eating surface may include a base member 20. Such a base member 20 may have a plurality of side walls 21 configured in such a manner that an orifice 22 and a plurality of recessed receptacles 30 may be formed in the base member 20. The base member 20 may be suitably sized to fit in limited space areas such as restaurant table tops and bar counters. Additionally, the base member 20 may be produced from wood, glass, metal, or other material known in the art, to create various designs for numerous applications and to be aesthetically pleasing for use in both homes and businesses. Additionally, the apparatus 10 may conveniently allow for rigid maintenance of sanitation and cleanliness which is often associated with dining environments.

The apparatus 10 may further include a container 40 removably positioned within the orifice 22 of the base member 20 and thereby intermediately juxtaposed between the receptacles 30 respectively. The container 40 may additionally be adapted to receive and segregate trash therein while the receptacles 30 may be adapted to receive foodstuff therein. In this manner, the present invention 10 may provide the unpredictable and unexpected benefit of allowing a user to easily store condiments such as ketchup, mustard, and salt and pepper with a trash holding container 40 to house used napkins and other food waste all in one central location. The apparatus 10 may advantageously be an all-in-one space saver to users in public and private areas alike. The apparatus 10 may be designed with few or many storage receptacles 30, as may suit the particular needs of a given user.

Figure 4:
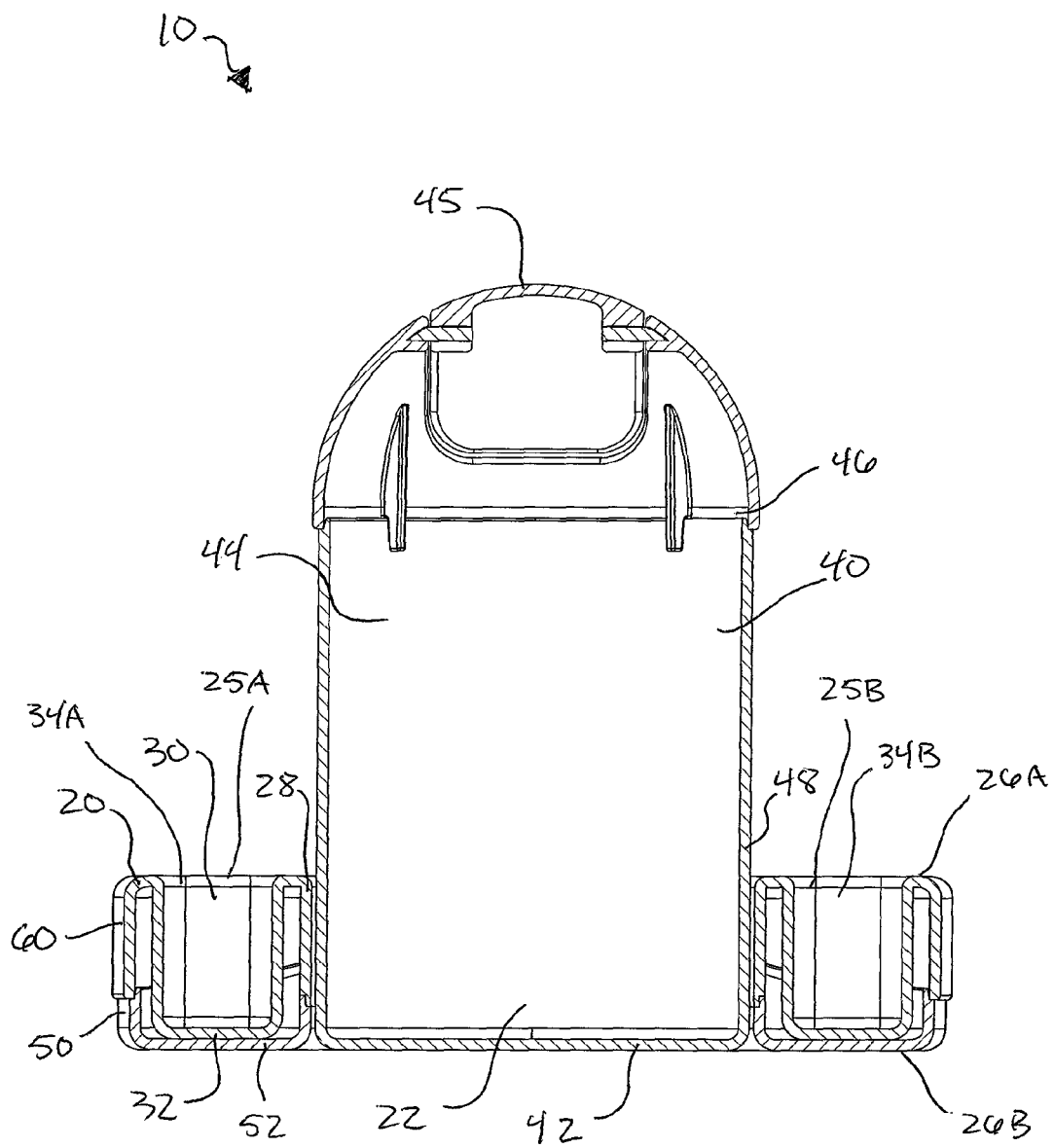
FIG. 4 is a cross-sectional view of the apparatus shown in FIG. 1, showing the movement of the base member in relation to the container.
Figure 5:
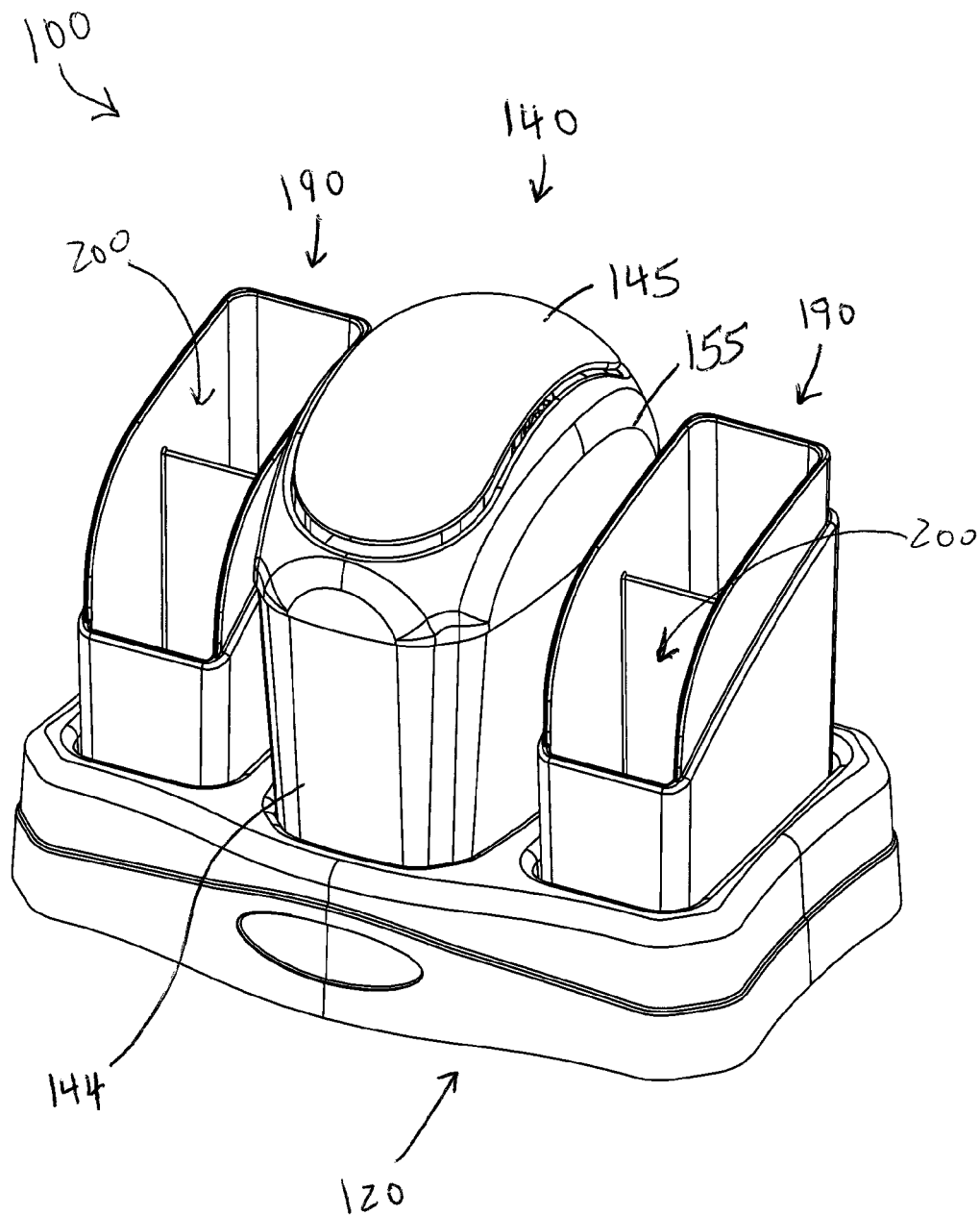
FIG. 5 is a perspective view showing a combined trash receptacle and condiment holding apparatus, in accordance with another embodiment of the present invention.
Figure 6:
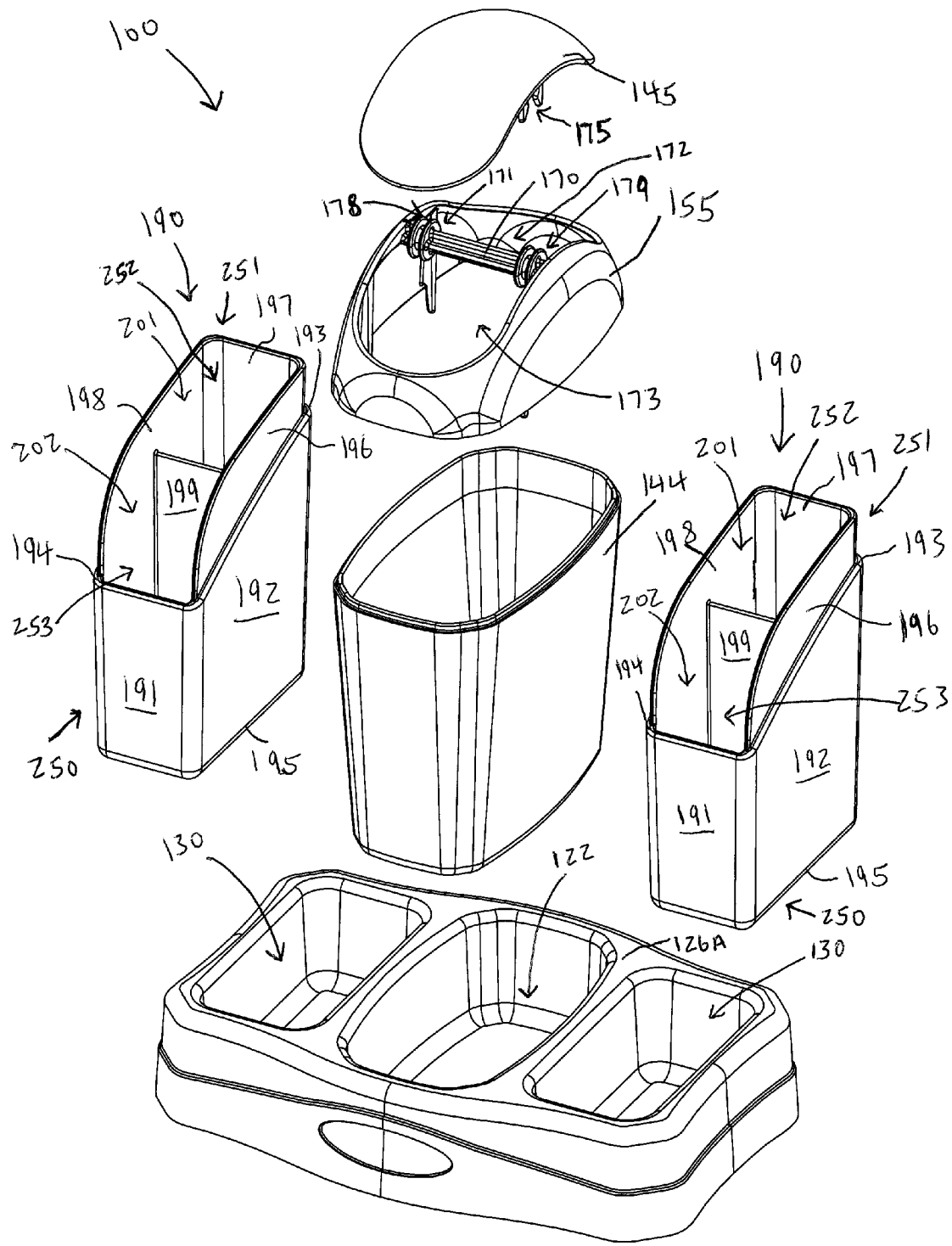
FIG. 6 is an exploded view of the apparatus shown in FIG. 5.
Figure 7:
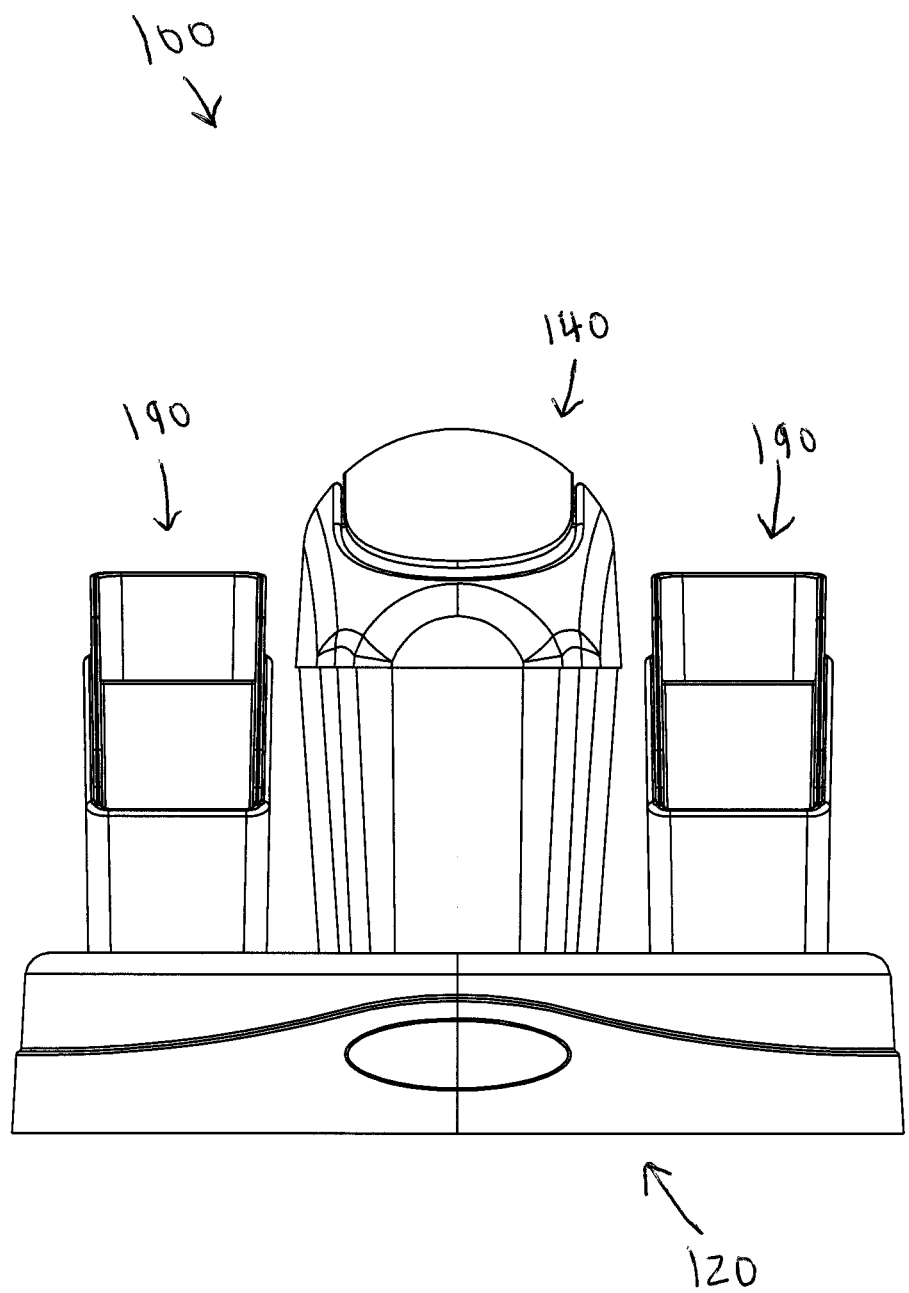
FIG. 7 is a front elevational view of the apparatus shown in FIG. 5.
Figure 8:
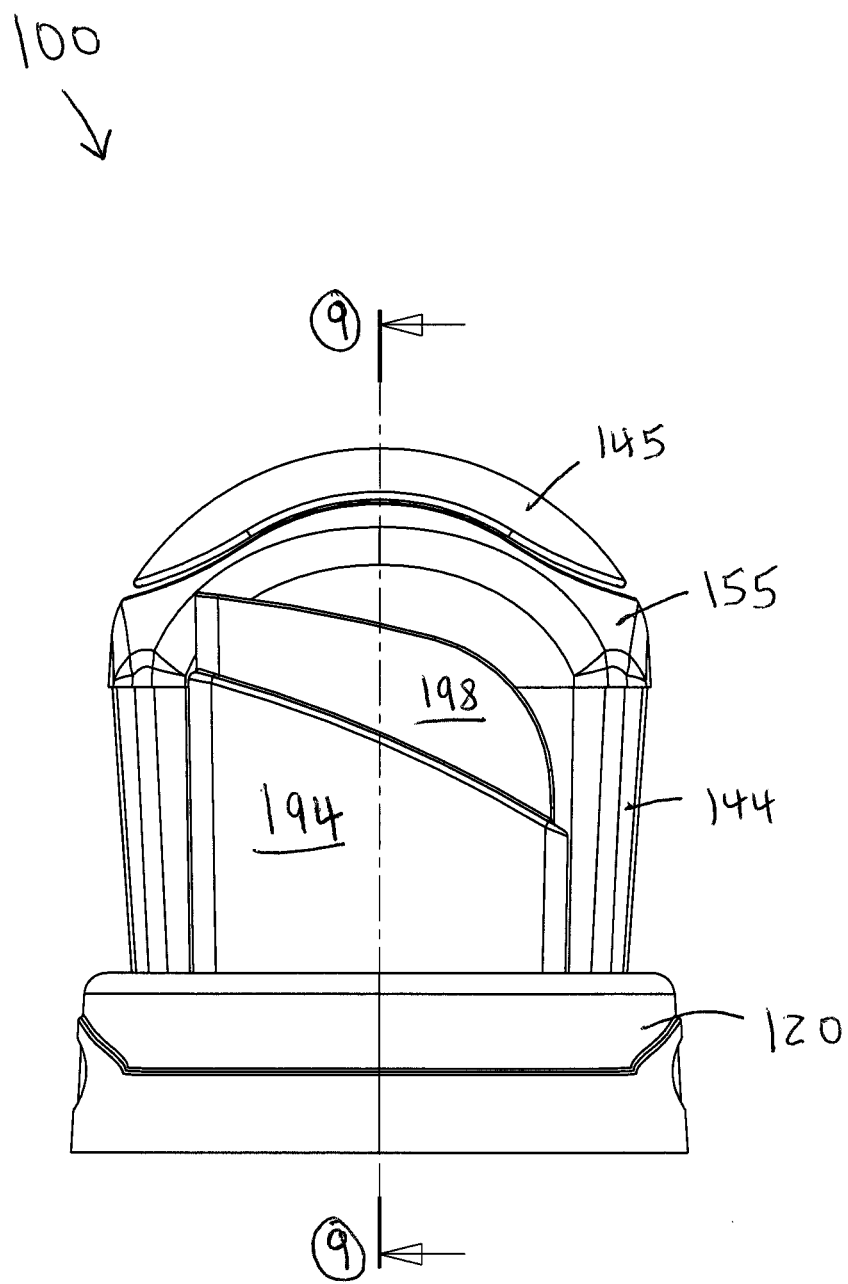
FIG. 8 is a side elevational view of the apparatus shown in FIG. 5.
Figure 9:
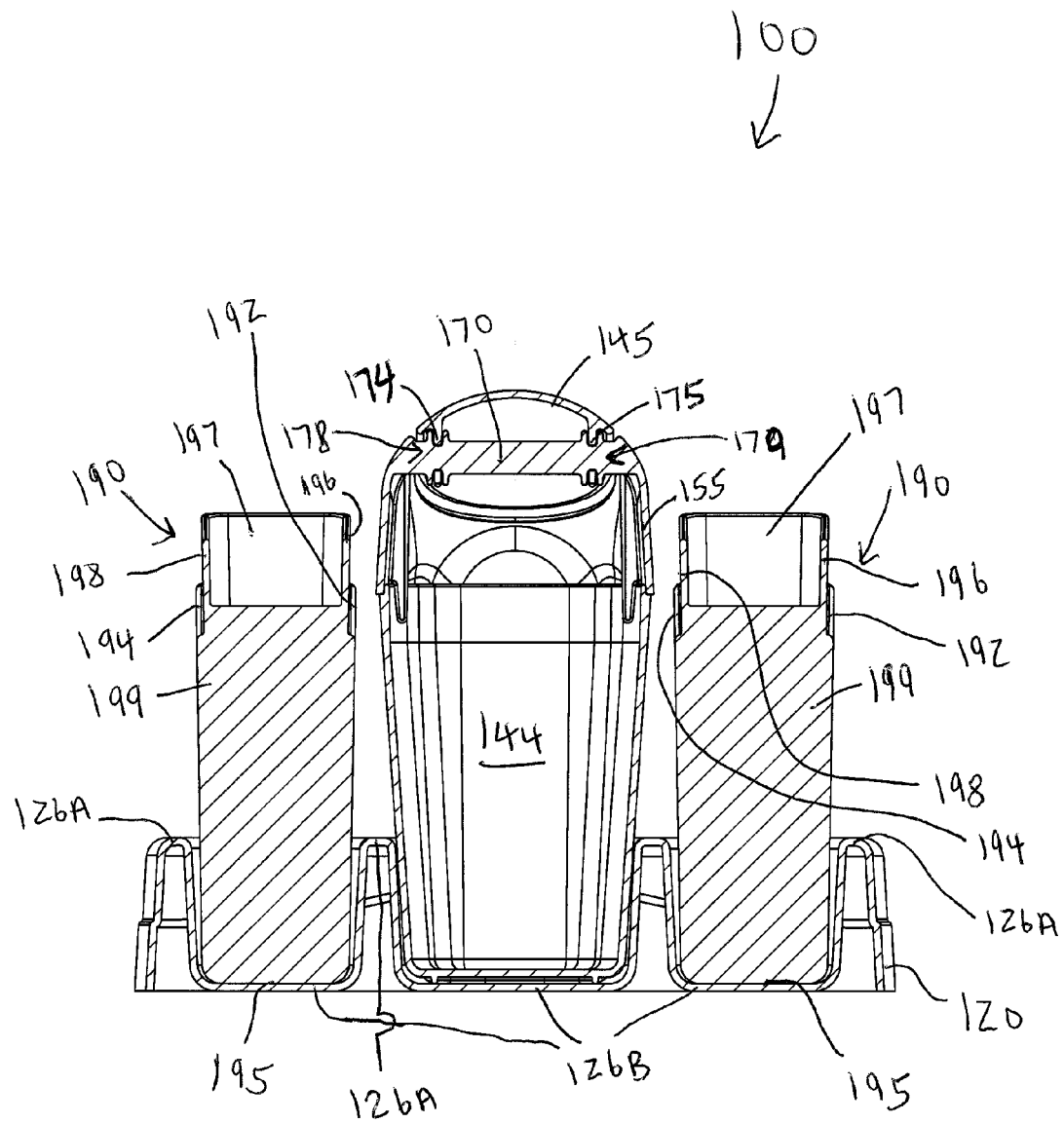
FIG. 9 is a cross-sectional view of the apparatus shown in FIG. 8, taken along line 9-9.

Now referring specifically to FIG. 4, the orifice 22 may extend downwardly from an uppermost surface 26A of the base member 20 and pass through a lowermost surface 26B of the base member 20. In this manner, one of the container 40 and the base member 20 may be freely and independently separated from another one of the container 40 and the base member 20 while the other one of the container 40 and the base member 20 remains at a static and fixed upright position. Thus, when the container 40 is filled with trash, the user may simply remove it from the base member 20 for disposal of its contents and cleaning of both the base member 20 and container 40. Such a feature is advantageous for ensuring cleanliness and health requirements are met when used in food serving establishments.

Still referring to FIG. 4, the combined trash receptacle and condiment holding apparatus 10 may additionally include a bottom-most surface 42 of the container 40 being coplanar with a bottom-most surface of the base member 20 when the container 40 and the base member 20 are disposed at the static and fixed upright positions respectively. The container 40 may further have an outermost surface 48 that contiguously adjoins an innermost surface 28 of the orifice 22 so that the container 40 may be linearly displaced along a first vertical axis 15 centrally defined within the orifice 22 while the base member 20 remains at the static and fixed upright position. In addition, the container 40 may remain at the static and fixed upright position while the base member 20 is linearly reciprocated along a linear travel path aligned parallel to a longitudinal length of the container 40. This advantageously assures the container 40 may remain steadily balanced within the orifice 22 of the base member 20 to prevent accidental tipping and emptying out of the trash housed within the container 40.

Referring to FIGS. 1 and 4, the apparatus 10 may further include each of the receptacles 30 being isolated from the orifice 22 such that the container 40 may remain at the static and fixed upright position while the base member 20 is rotated about the outer surface of container 40. In this manner, if a user desired to access condiments stored on one location 25A of the base member 20, the base member 20 may simply be rotated without affecting the container's position. Additionally, the base member 20 may include removably engaged bottom and top lids 50, 60 contiguously situated along an entire surface area of the base member 20. The receptacles 30 may be formed within the top lid 60 such that a bottom-most surface 32 of the receptacles 30 may lay parallel to a bottom-most surface 52 of the bottom lid 50. Further, the bottom lid 50 may remain at the static and fixed position while the top lid 60 is detached therefrom. This provides the advantageous benefit of allowing the user to remove the top lid 60 to be washed by hand or within a dish washer to further promote cleanliness and health.

Again referring to FIGS. 1 and 4, the combined trash receptacle and condiment holding apparatus 10 may further include first and second ones of the receptacles 34A, 34B being oppositely seated at opposed first and second locations 25A, 25B diametrically spaced apart from the orifice 22. Additionally, the base member 20 may be freely rotatable along a 180 degree arcuate path defined about the container 40. This may operate such that the first and second receptacles 34A, 34B may be synchronously displaced to the second and first locations 25A, 25B respectively while the container 40 remains at a static and fixed position. The rotatable base member 20 allows the user to easily access items housed within the receptacles 30 on both sides of the apparatus 10 by simply turning the base member 20.

Again referring to FIG. 4, the container 40 may further include a reservoir 44 and an access door 45 pivotally conjoined to a top edge 46 of the reservoir 44. In this manner, an interior of the reservoir 44 may remain isolated from the receptacles 30 during operating conditions. The user may easily open the access door 45, deposit trash and food waste into the reservoir 44, and close the door to seal trash therein, promote cleanliness, and reduce odors generated by the waste material. By allowing the user to isolate the unwanted articles within the container 40, the offensive odor and resultant debris may be kept to a minimum, thereby allowing the user to enjoy their company and their meal.

The present invention 10 may further include a method for segregating trash from foodstuff on an existing eating surface. Such a method may include the chronological steps of first providing a base member 20 preferably having a plurality of side walls 21 configured in such a manner that an orifice 22 as well as a plurality of recessed receptacles 30 may be formed in the base member 20. A second step of the method may include providing and removably positioning a container 40 within the orifice 22 by intermediately juxtaposing the container 40 between the receptacles 30 respectively. Next, the method may include the container 40 receiving and segregating the trash therein while the receptacles 30 receive the foodstuff therein.

Thereafter, a fourth step of the method may include the orifice 22 extending downwardly from an uppermost surface 26A of the base member 20 and passing through a lowermost surface 26B of the base member 20. Finally, the method may include a fifth step of freely and independently separating one of the container 40 and the base member 20 from another one of the container 40 and the base member 20 while maintaining the other one of the container 40 and the base member 20 at a static and fixed upright position. A bottom-most surface 42 of the container 40 may be coplanar with a bottom-most surface of the base member 20 when the container 40 and the base member 20 are disposed at the static and fixed upright positions respectively.

The method combined with the present invention 10 provides the unexpected and unpredictable benefit of providing the user with a means of housing common food condiments with a trash receptacle to place waste generated during meals. The apparatus 10 may be employed in the home or by restaurant owners, and placed on each table in an eating establishment. In this manner, the apparatus 10 may advantageously be taken apart for cleaning on a regular basis, and may provide customers of the restaurant with all supplemental items needed during meals, in one central location.

In an alternate embodiment the apparatus may include a 360 degree rotatable base with uniform receptacles designed to house a plurality of spices and seasoning containers. In addition, one embodiment may be employed in an office setting, whereby the plurality of receptacles within the base may be suitably shaped for housing pens, paper clips, sticky notes, and other office supplies, while the container lid may include a paper shredding device for destroying sensitive paperwork generated in the office.

Now referring to FIGS. 5-9, the present disclosure further includes an alternate embodiment including a combined trash receptacle and condiment holding apparatus 100 for segregating trash from foodstuff on an existing eating surface. Such a combined trash receptacle and condiment holding apparatus 100 includes a base member 120 having a plurality of side walls configured in such a manner that an orifice 122 as well as a plurality of recessed receptacles 130 are formed in the base member 120, a plurality of vessels 190 removably positioned within the receptacles 130, respectively, and supported at the base member 120, and a container 140 removably positioned within the orifice 122 and intermediately juxtaposed between the vessels 190 respectively. The container 140 is adapted to receive and segregate the trash therein while the vessels 190 are adapted to receive the foodstuff therein. The orifice 122 and the receptacles 130 extend downwardly from an uppermost surface 126A of the base member 120 and remain supported on a lowermost surface 126B of the base member 120. In this manner, the container 140 and the vessels 190 remain at a static and fixed upright position when the base member 120 is transported.

In a non-limiting exemplary embodiment, the container 140 is intermediately juxtaposed between the receptacles 130 such that the receptacles 130 are oppositely seated apart from the container 140.

In a non-limiting exemplary embodiment, the container 140 and the vessels 190 are independently removed from the base member 120.

In a non-limiting exemplary embodiment, the vessels 190 include a lower section 250 including first, second, third, fourth and fifth sides 191, 192, 193, 194, 195 configured to define a cavity 200 therebetween, and an upper section 251 including sixth, seventh and eighth sides 196, 197, 198 monolithically formed with the second, third and fourth sides 192, 193, 194, respectively. In this manner, the upper section 251 is configured to define an open top end 252 and an open front end 253 extending upwardly from the lower section 250 and in fluid communication with the cavity 200. A divider 199 is monolithically formed with each of the lower 250 and upper 251 sections thereby bifurcating the cavity 200 into an anterior segment 202 and a posterior segment 201 isolated therefrom.

In a non-limiting exemplary embodiment, the container 140 includes a reservoir 144, and a lid 155 removably engaged to the reservoir 144. Such a lid 155 includes a top aperture 173, and a rectilinear rod 170 having axially opposed first and second ends 171, 172 statically mated to a top of the lid 155. Thus, the rod 170 spans subjacent to the top aperture 173. An access door 145 is rotatably coupled to the rod 170 in such a manner that an interior of the reservoir 144 is selectively isolated from the vessels 190 as needed.

In a non-limiting exemplary embodiment, the rod 170 is monolithically formed with the lid 155 and includes a first pair of stops 178 statically wrapped about the first end 171, and a second pair of stops 179 statically wrapped about the second end 172. Notably, the access door 145 includes first and second arms 174, 175 removably coupled to first and second ends 171, 172.

In a non-limiting exemplary embodiment, the first and second arms 174, 175 are intercalated between the first and second pairs of stops 178, 179, respectively, such that the first and second arms 174, 175 are prohibited from linearly reciprocating along a longitudinal length of the rod 170 while the access door 145 is articulated about the rod 170.

The present disclosure further includes a method of utilizing a combined trash receptacle and condiment holding apparatus 100 for segregating trash from foodstuff on an existing eating surface. Such a method includes the chronological steps of: providing a base member 120 having a plurality of side walls configured in such a manner that an orifice 122 as well as a plurality of recessed receptacles 130 are formed in the base member 120 (the orifice 122 and the receptacles 130 extend downwardly from an uppermost surface 126A of the base member 120 and remain supported on a lowermost surface 126B of the base member 120); providing and removably positioning a plurality of vessels 190 within the receptacles 130, respectively, such that the vessels 190 are supported at the base member 120; providing and removably positioning a container 140 within the orifice 122 by intermediately juxtaposing the container 140 between the receptacles 130 respectively; the container 140 receiving and segregating the trash therein while the vessels 190 receive the foodstuff therein;

and while transporting the base member 120, maintaining each of the container 140 and the vessels 190 at a static and fixed upright position.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A combined trash receptacle and condiment holding apparatus for segregating trash from foodstuff on an existing eating surface, said combined trash receptacle and condiment holding apparatus comprising:
   a base member having a plurality of side walls configured in such a manner that an orifice as well as a plurality of recessed receptacles are formed in said base member;
   a plurality of vessels removably positioned within said receptacles, respectively, and supported at said base member; and
   a container removably positioned within said orifice and intermediately juxtaposed between said vessels respectively, said container adapted to receive and segregate the trash therein while said vessels are adapted to receive the foodstuff therein;
   wherein each of said orifice and said receptacles extends downwardly from an uppermost surface of said base member and remains supported on a lowermost surface of said base member;
   wherein said container comprises
   a reservoir; and
   a lid removably engaged to said reservoir, said lid including
      a top aperture,
      a rectilinear rod having axially opposed first and second ends statically mated to a top of said lid and thereby spans subjacent to said top aperture, and
      an access door rotatably coupled to said rod in such a manner that an interior of said reservoir is selectively isolated from said vessels as needed;
   wherein said rod is monolithically formed with said lid and comprises
      a first pair of stops statically wrapped about said first end, and
      a second pair of stops statically wrapped about said second end;
      wherein said access door includes first and second arms removably coupled to first and second ends.

2. The combined trash receptacle and condiment holding apparatus of claim 1, wherein said container is intermediately juxtaposed between said receptacles such that said receptacles are oppositely seated apart from said container.

3. The combined trash receptacle and condiment holding apparatus of claim 1, wherein each of said container and said vessels is independently removed from said base member.

4. The combined trash receptacle and condiment holding apparatus of claim 1, wherein each of said vessels comprises:
   a lower section including first, second, third fourth and fifth sides configured to define a cavity therebetween;
   an upper section including sixth, seventh and eighth sides monolithically formed with said second, third and fourth sides, respectively; wherein said upper section is configured to define an open top end and an open front end extending upwardly from said lower section and in fluid communication with said cavity; and
   a divider monolithically formed with each of said lower and upper sections;
   wherein said divider bifurcates said cavity into an anterior segment and a posterior segment isolated therefrom.

5. The combined trash receptacle and condiment holding apparatus of claim 1, wherein said first and second arms are intercalated between said first and second pairs of stops, respectively, such that said first and second arms are prohibited from linearly reciprocating along a longitudinal length of said rod while said access door is articulated about said rod.

6. A combined trash receptacle and condiment holding apparatus for segregating trash from foodstuff on an existing eating surface, said combined trash receptacle and condiment holding apparatus comprising:
   a base member having a plurality of side walls configured in such a manner that an orifice as well as a plurality of recessed receptacles are formed in said base member;
   a plurality of vessels removably positioned within said receptacles, respectively, and supported at said base member; and
   a container removably positioned within said orifice and intermediately juxtaposed between said vessels respectively, said container adapted to receive and segregate the trash therein while said vessels are adapted to receive the foodstuff therein;
   wherein each of said orifice and said receptacles extends downwardly from an uppermost surface of said base member and remains supported on a lowermost surface of said base member;
   wherein each of said container and said vessels remains at a static and fixed upright position when said base member is transported;
   wherein said container comprises
   a reservoir; and
   a lid removably engaged to said reservoir, said lid including
      a top aperture,
      a rectilinear rod having axially opposed first and second ends statically mated to a top of said lid and thereby spans subjacent to said top aperture, and
      an access door rotatably coupled to said rod in such a manner that an interior of said reservoir is selectively isolated from said vessels as needed;
   wherein said rod is monolithically formed with said lid and comprises
      a first pair of stops statically wrapped about said first end, and
      a second pair of stops statically wrapped about said second end;
      wherein said access door includes first and second arms removably coupled to first and second ends.

7. The combined trash receptacle and condiment holding apparatus of claim 6, wherein said container is intermediately juxtaposed between said receptacles such that said receptacles are oppositely seated apart from said container.

8. The combined trash receptacle and condiment holding apparatus of claim 6, wherein each of said container and said vessels is independently removed from said base member.

9. The combined trash receptacle and condiment holding apparatus of claim 6, wherein each of said vessels comprises:
   a lower section including first, second, third fourth and fifth sides configured to define a cavity therebetween;
   an upper section including sixth, seventh and eighth sides monolithically formed with said second, third and fourth sides, respectively; wherein said upper section is configured to define an open top end and an open front end extending upwardly from said lower section and in fluid communication with said cavity; and a divider monolithically formed with each of said lower and upper sections;

wherein said divider bifurcates said cavity into an anterior segment and a posterior segment isolated therefrom.

10. The combined trash receptacle and condiment holding apparatus of claim 6, wherein said first and second arms are intercalated between said first and second pairs of stops, respectively, such that said first and second arms are prohibited from linearly reciprocating along a longitudinal length of said rod while said access door is articulated about said rod.

11. A method of utilizing a combined trash receptacle and condiment holding apparatus for segregating trash from foodstuff on an existing eating surface, said method comprising the chronological steps of:

providing a base member having a plurality of side walls configured in such a manner that an orifice as well as a plurality of recessed receptacles are formed in said base member, each of said orifice and said receptacles extending downwardly from an uppermost surface of said base member and remaining supported on a lowermost surface of said base member;

providing and removably positioning a plurality of vessels within said receptacles, respectively, such that said vessels are supported at said base member;

providing and removably positioning a container within said orifice by intermediately juxtaposing said container between said receptacles respectively;

said container receiving and segregating the trash therein while said vessels receive the foodstuff therein; and while transporting said base member, maintaining each of said container and said vessels at a static and fixed upright position;

wherein said container comprises a reservoir; and a lid removably engaged to said reservoir, said lid including
  a top aperture,
  a rectilinear rod having axially opposed first and second ends statically mated to a top of said lid and thereby spans subjacent to said top aperture, and
  an access door rotatably coupled to said rod in such a manner that an interior of said reservoir is selectively isolated from said vessels as needed;

wherein said rod is monolithically formed with said lid and comprises
  a first pair of stops statically wrapped about said first end, and
  a second pair of stops statically wrapped about said second end;

wherein said access door includes first and second arms removably coupled to first and second ends.

\* \* \* \* \*